(12) United States Patent
Van Tassel (10) Patent No.: US 8,499,569 B2
(45) Date of Patent: Aug. 6, 2013

(54) SYSTEM AND PROCESS FOR TRANSPORTING LNG BY NON-SELF-PROPELLED MARINE LNG CARRIER

(75) Inventor: Gary W. Van Tassel, Seaford, VA (US)

(73) Assignee: Argent Marine Management, Inc., Incline Village, NV (US)

( * ) Notice: Subject to any disclaimer, the term of this patent is extended or adjusted under 35 U.S.C. 154(b) by 1986 days.

(21) Appl. No.: 11/222,750

(22) Filed: Sep. 12, 2005

(65) Prior Publication Data
US 2006/0053806 A1    Mar. 16, 2006

Related U.S. Application Data

(60) Provisional application No. 60/608,913, filed on Sep. 13, 2004.

(51) Int. Cl.
*F17C 3/10* (2006.01)
*F17C 13/08* (2006.01)

(52) U.S. Cl.
USPC .............................. 62/48.2; 62/53.2; 62/611

(58) Field of Classification Search
USPC ................. 62/48.1, 48.2, 50.4, 52.1, 53.2
See application file for complete search history.

(56) References Cited

U.S. PATENT DOCUMENTS

| | | | |
|---|---|---|---|
| 1,095,461 A | 5/1914 | Emmet | |
| 2,159,251 A * | 5/1939 | Brizzolara | 62/117 |
| 2,795,937 A | 3/1955 | Sattler et al. | |
| 2,940,268 A | 6/1960 | Morrison | |
| 3,332,386 A * | 7/1967 | Massac | 114/74 R |
| 3,815,540 A * | 6/1974 | Peereboom | 114/248 |
| 3,857,245 A * | 12/1974 | Jones | 60/651 |
| 3,864,918 A | 2/1975 | Lorenz | |
| 3,885,394 A | 5/1975 | Witt et al. | |
| 4,114,555 A | 9/1978 | O'Brien, Jr. | |
| 4,417,878 A | 11/1983 | Koren | |
| 4,924,822 A | 5/1990 | Asai et al. | |
| 5,289,793 A | 3/1994 | Aker | |
| 5,711,270 A | 1/1998 | Pedersen | |
| 6,240,867 B1 | 6/2001 | Hoyle et al. | |
| 6,329,725 B1 | 12/2001 | Woodall et al. | |
| 2005/0172880 A1 | 8/2005 | Laurilehto et al. | |

OTHER PUBLICATIONS

Article entitled World's first Commercial LNG barge by Donald W. Oakley from Ocean Industry Nov. 1973, pp. 29-32.

* cited by examiner

*Primary Examiner* — John Pettitt
(74) *Attorney, Agent, or Firm* — Amster Rothstein & Ebenstein LLP (57) ABSTRACT

Marine LNG carrier and method of operating the marine LNG carrier. The LNG carrier carries LNG in at least one tank. Gas composed of evaporated LNG within the at least one tank is removed. The gas is fed to at least one gas consuming prime mover of the LNG carrier. Power is provided with the at least one gas consuming prime mover. This Abstract is not intended to define the invention disclosed in the specification, nor intended to limit the scope of the invention in any way.

29 Claims, 6 Drawing Sheets

SYSTEM AND PROCESS FOR TRANSPORTING LNG BY NON-SELF-PROPELLED MARINE LNG CARRIER

CROSS-REFERENCE TO RELATED APPLICATIONS

The present application claims the benefit of U.S. Provisional Patent Application No. 60/608,913, filed on Sep. 13, 2004 under 35 U.S.C. §119(e), the disclosure of which is expressly incorporated by reference herein in its entirety.

BACKGROUND OF THE INVENTION

1. Field of the Invention

The invention relates to a method of operating a marine liquefied natural gas (LNG) carrier in which LNG is carried in at least one tank, wherein the method includes removing gas generated by evaporation of the LNG within the at least one tank, feeding the gas to at least one gas consuming prime mover of the LNG carrier, and providing power, with the at least one gas consuming prime mover, to at least one thruster. The at least one thruster is capable of consuming full power at all times notwithstanding actual thrust requirements of the LNG carrier.

The invention also relates to a method of operating a marine liquefied natural gas (LNG) carrier in which LNG is carried in at least one tank, wherein the method includes removing gas generated by evaporation of the LNG within the at least one tank, feeding the gas to at least one gas consuming prime mover of the LNG carrier, increasing a pressure of a first portion of the gas, re-liquefying the first portion, and feeding the first portion of the gas to spray nozzles arranged within the at least one tank.

The invention also relates to a method of operating a marine liquefied natural gas (LNG) carrier in which LNG is carried in at least one tank, wherein the method includes removing gas generated by evaporation of the LNG within the at least one tank, feeding the gas to at least one gas consuming prime mover of the LNG carrier, providing power, with the at least one gas consuming prime mover, to at least one electric generator mounted to the LNG carrier, and supplying electrical current from the at least one generator to at least one electric propulsion motor of a tugboat. The tugboat provides propulsion to the LNG carrier.

The invention also relates to a method of operating a marine liquefied natural gas (LNG) carrier in which LNG is carried in at least one tank, wherein the method includes removing gas generated by evaporation of the LNG within the at least one tank, feeding the gas to at least one gas consuming prime mover of the LNG carrier, providing power, with the at least one gas consuming prime mover, to at least one electric generator arranged on the LNG carrier, and supplying electrical current from the at least one generator to a tugboat via at least one flexible cable. The electrical current is sufficient to meet electric power demands of the tugboat at least when the tugboat is providing propulsion power to move the LNG carrier through water.

The invention also relates to a marine liquefied natural gas (LNG) carrier including at least one tank storing the LNG, at least one LNG gas consuming prime mover providing power to at least one thruster, an arrangement for removing gas generated by evaporation of the LNG within the at least one tank, an arrangement for feeding the gas to the at least one gas consuming prime mover, the least one thruster consuming full power of the at least one gas consuming prime mover at all times notwithstanding actual thrust requirements of the LNG carrier.

The invention also relates to a marine liquefied natural gas (LNG) carrier including at least one tank storing the LNG, at least one LNG gas consuming prime mover, an arrangement for removing gas generated by evaporation of the LNG within the at least one tank, an arrangement for feeding the gas to the at least one gas consuming prime mover, an arrangement for increasing a pressure of a first portion of the gas, an arrangement for liquefying a first portion of the gas, and an arrangement for feeding the first portion of the gas to spray nozzles arranged within the at least one tank.

The invention also relates to a marine liquefied natural gas (LNG) carrier including at least one tank storing the LNG, at least one LNG gas consuming prime mover, at least one electric generator mounted to the LNG carrier, an arrangement for removing gas generated by evaporation of the LNG within the at least one tank, an arrangement for feeding the gas to the at least one gas consuming prime mover. The at least one gas consuming prime mover provides power to the at least one electric generator. The at least one generator is structured and arranged to supply electrical current to at least one electric propulsion motor of a tugboat when the tugboat provides propulsion to the LNG carrier.

2. Discussion of Background Information

Natural gas, when cooled to approximately $-260°$ F. changes phase from a gas to a liquid. In this state, it is called Liquefied Natural Gas or LNG. During this cooling process, the volume required to hold a specific quantity of natural gas is reduced approximately 600 times making it possible to transport significant, and economic, quantities of natural gas over great distances from source to market.

LNG is increasingly being utilized to effect the transportation of natural gas from its source in remote regions of the world to end users in population centers where demand for energy, particularly natural gas, is continually increasing. LNG can be transported in highly specialized ships or LNG Carriers (LNGC(s)). These vessels are very large and expensive and rely on transporting large volumes of LNG to achieve economical transportation rates.

Because LNG is transported in large quantities to achieve economical transportation rates over long distances, LNG receiving terminals are also quite large and situated in strategic locations for delivery of natural gas by pipeline to high demand areas. At the receiving terminals, the LNG is off-loaded as a cryogenic liquid at $-260°$ F. by pumping from the LNGC to the land based tanks of the receiving terminal. From the terminal storage tanks the LNG is then pumped by high pressure pumps to vaporizers where heat is added to return the natural gas to a gaseous state at pipeline pressures. Thereafter, it is sent out to users through traditional natural gas pipeline systems.

This approach serves the demand of gas consumers with access to the distribution pipelines, in most situations. It does not serve the demands of those gas consumers that are remote from the pipelines or those consumers connected to pipelines that have limited transmission capacity such that during high demand peak periods the pipelines cannot physically handle the quantity of natural gas being demanded.

Alternatively, some of these remote/peak customers can be more fully served by redistributing smaller quantities of LNG from a larger receiving terminal utilizing a smaller LNG vessel in the form of a lower cost non-self-propelled LNG carrier or LNG barge. Such an LNG barge would be loaded with LNG at a large LNG receiving terminal by pumping LNG from the terminals land based tanks to the LNG barge.

Once loaded the LNG barge would be pushed to its destination site where its cargo of LNG would be offloaded, vaporized and processed as necessary. The resulting natural gas would then be distributed by local pipeline(s) to the customers. This approach is not dependent on long distance transmission/distribution pipelines and can, therefore, serve gas customers accessible by suitable water routes in remote areas or where peak demands cannot be met by existing distribution pipelines.

An LNG barge and such a distribution system is described in an Article entitled *World's first Commercial LNG barge* by Donald W. Oakley from OCEAN INDUSTRY NOVEMBER 1973, pages 29-32 is hereby expressly incorporated by reference in its entirety. This is the only LNG barge built to date and was operational for only a short period of time in 1974 when it delivered a total of only 6 LNG cargoes.

LNG is a boiling cryogen at atmospheric temperatures and pressures. It is stored and transported in heavily insulated tanks. Although heat inflow to the LNG is significantly reduced by the tank insulation, it cannot be entirely eliminated. Consequently a quantity of cold natural gas vapor (boil off) is constantly being generated and must be removed from the tank and disposed of in order to prevent over pressure of the LNG tank.

Unlike other gaseous fuels such as propane and butane which can be stored as a liquid at atmospheric temperatures by allowing the liquid and the gas in the tank to reach a stable equilibrium vapor pressure for any given atmospheric temperature, LNG (principle component methane), due to its low critical point pressure (673+psia for methane), critical point temperature (−115.8° F. for methane) and very high vapor pressures, cannot be maintained as a liquid under pressure at atmospheric temperatures.

The resulting boil off is either vented to the atmosphere (limited, by regulation, as an emergency/extraordinary procedure only, as natural gas is flammable and considered a green house gas); heated, pressurized and sent to the gas distribution system (in the case of land based LNG tanks); re-liquefied and returned to the tank as LNG; flared as waste gas; burned in the propulsion machinery (in the case of LNGCs) as fuel or contained in the LNG tank for a finite period of time by allowing the cargo tank vapor space to increase in pressure as the LNG continues to boil. This later option can only be sustained for a relatively short period of time, typically days (generally less than a month).

In the case of the only LNG barge to be built (reference 1) the boil off was allowed to accumulate in the tank by allowing the pressure in the tank to increase over time. The tanks and insulation system was designed to contain the boil off for a period of 45 days before the LNG tank relief valves would open due to overpressure releasing the natural gas to the atmosphere.

A significant problem with this approach is that the LNG itself will significantly rise in temperature to reach the equilibrium temperature corresponding to the pressure of the tank. As the tank pressure rises the LNG temperature will also rise. If this warm LNG is then subsequently pumped into an LNG storage tank that is at lower/normal pressure (slightly above atmospheric pressure ~+100 millibars) the warm LNG will rapidly vaporize and release large volumes of cold natural gas as the LNG is cooled by evaporative processes until it again reaches equilibrium to the new tank pressure. This is unacceptable as the receiving terminal will be unable to dispose of the excess gas and tank overpressure is likely with subsequent release of natural gas to the atmosphere. Even a slightly warmer LNG can be problematic due to the phenomenon of "roll-over" resulting in rapid and uncontrolled LNG vaporization.

Large, self propelled LNGCs use the boil off as propulsion fuel in the ship's engines and are, therefore, able to maintain proper LNG tank pressure and LNG temperature. Since a barge does not have propulsion engines, this is not an option in the prior art.

The LNG barge described in the above-noted Article solved this problem of increasing LNG temperature with time by cooling the LNG in a controlled fashion during the discharge operation prior to the LNG being pumped into the land based tanks. This process is described in this Article and will not be repeated here.

This cooling process, depending on the length of time the LNG was aboard the barge and other factors, can result in discharge delays and considerable additional expense. It also significantly complicates the discharging operation. Finally, this added LNG cooling equipment is costly to purchase and expensive to maintain.

A further problem with handling natural cargo boil off by allowing the tank to pressurize is the resulting increase in the equilibrium pressure/temperature relationship as the LNG warms from the heat inflow. This creates an increased risk of extremely rapid phase transition from liquid to gas if the cargo is suddenly released from a breach of the cargo tank. This significantly increases the risk associated with the cargo of LNG.

FIG. 5 of U.S. Pat. No. 2,795,937, the disclosure of which is hereby expressly incorporated by reference in its entirety, discloses a transfer of boil off gas from the cargo tanks of a barge to a tugboat towing the barge using a flexible hose or other transference device. The boil off gas is then used as fuel in the tugboat's engines in much the same manner as in a self propelled LNGC (ship). There are many problems associated with this concept, however, which have prevented it from being reduced to practice. The most significant problem is the high likelihood of the hose being severed by the relative motion and forces between the barge and tug, and the resulting release of highly flammable natural gas. Additionally, barges are typically towed hundreds of feet behind the tugboat requiring an extremely long hose that would be subject to excessive forces, damage and failure.

U.S. Pat. No. 3,864,918, the disclosure of which is hereby expressly incorporated by reference in its entirety, discloses a method of partial liquefaction of LNG boil off gas by compression and heat exchange with cold LNG boil off gas. The method taught differs from the instant invention in a number of ways in that, among other differences, a much simplified heat exchanger/condenser is employed, there is no need for a liquid level control system and expansion of the re-condensed LNG takes place within the LNG cargo tank maximizing the beneficial effect from the Joule-Thompson cooling as a result of the expansion of the re-condensed LNG to further reduce the LNG cargo tank pressure. According to this prior art document, the required expansion of the re-condensed LNG takes place external from the LNG cargo tanks and, therefore, the resulting Joule-Thompson effect cooling resulting from the expansion of the re-condensed LNG is less effective in directly reducing LNG cargo tank pressure. Further, the flow that is returned to the LNG cargo tank(s) will, as a result of the external expansion, be a two phase mixture of vapor and liquid versus a single phase liquid flow, returning vapor to the cargo tank along with LNG versus LNG alone.

The invention(s) disclosed herein addresses the problems associated with LNG boil off gas in an LNG barge, of the type discussed above, in a number of different and novel ways. The methods disclosed herein may be applied singularly or in combination as the circumstances dictate.

SUMMARY OF THE INVENTION

A first non-limiting example of a method according to the invention can be described as follows. Although an LNG barge does not have main propulsion machinery, i.e., because that function is provided by a tugboat, the LNG barge does have auxiliary engines to provide electrical power to meet the electric power needs of the LNG barge. Electric generator prime movers that can utilize natural gas as fuel, can be fueled by the LNG boil off (after appropriate pre-treatment to provide for proper temperature and pressure of the fuel). In this case, the invention provides that the LNG boil off gas is withdrawn from the insulated LNG tanks by piping and associated control and isolation valves connected to the vapor space of the cargo tank, appropriately processed by compressing in gas compressor(s) (a centrifugal compressor is generally preferred but other types compressors can be utilized), heated to approximately ambient temperature by gas heaters (one non-limiting preferred method is by shell and tube heat exchanger heaters wherein the heat source is provided by waste heat, either from jacket water coolant or exhaust gas from e.g., the gas consuming prime movers) and used as fuel for barge mounted generators, thereby providing a method of reducing and controlling LNG cargo tank pressure on the LNG barge. The amount of boil off gas consumed and, therefore, the degree of LNG tank pressure control available is directly related to the power demands of the barge.

When transiting from port to port, the power demands of the LNG barge are limited, thereby severely limiting the degree of LNG tank pressure control available. High power consumers such as cargo pumps are only utilized in port during discharging and, therefore, will not provide sufficient power demand to provide for effective LNG tank pressure control.

A refinement of the above-noted method provides for the installation of a bow thruster of a type (so-called "water jet") that consumes full power regardless of whether thrust is being directed to port or starboard to control movement of the forward part of the LNG barge or neutral thrust deflecting the barge neither to port or starboard. According to at least one non-limiting embodiment, the thruster is capable of directing thrust towards the stern or bow in addition to port or starboard to augment the propulsion power provided by the tugboat. A further advantage of this type of thruster is the ability to effectively thrust the forward part of the barge port or starboard effecting positive directional control, regardless of the forward speed of the barge. The most preferred thruster is one in which water is sucked vertically from the bottom of the boat, its velocity and pressure are increased by an axial flow impeller driven by a prime mover mounted vertically, the water is then directed to a vane type control valve which directs the flow either to port or starboard or aft, or splits the flow equally to port and starboard thereby providing a zero net thrust on the fore part of the vessel. Alternately the impeller/control valve can be mounted horizontally. Standard tunnel type thrusters, in which a propeller is housed in a tunnel in the fore part of the vessel mounted transversely in the vessel, lose effectiveness with relatively small forward or aft speeds of the barge.

Since the water jet thruster is capable of consuming full power regardless of thrust demands or vessel movement, it will provide a substantial increase in power demand. In this way, significant quantities of LNG boil off gas will be consumed to provide required energy to power the bow thruster at all times of barge movement between ports, thereby providing meaningful LNG cargo tank pressure control. The bow thruster could be either powered by an electric motor, thereby increasing power consumption of the natural gas burning prime movers of the LNG barge generator(s) (if fitted) or, alternately, the bow thruster could be powered by its own natural gas burning prime mover and consume LNG boil off gas directly.

One example of a bow thruster with the capabilities described above is taught in U.S. Pat. No. 5,289,793, the disclosure of which is hereby expressly incorporated by reference it its entirety.

While insulation is a commonly used approach to reducing the ingress of heat into the LNG cargo, within the practical limits of reducing heat leakage into the LNG cargo tanks by insulation, the above-noted method, in concept, will generally be unable to consume all of the boil off gas necessary to maintain cargo tank pressures. Although the rate of cargo tank pressure increase will be significantly reduced, the cargo tanks will, nonetheless, increase in pressure with the detrimental effects of increased LNG cargo temperatures as described in earlier sections. However, for shorter loaded voyage durations typically less than one day total in loaded voyage duration, the resulting LNG cargo temperature increase may, in fact, be acceptable, in which case the application of the above-noted method alone may be advantageous.

Figure 1:
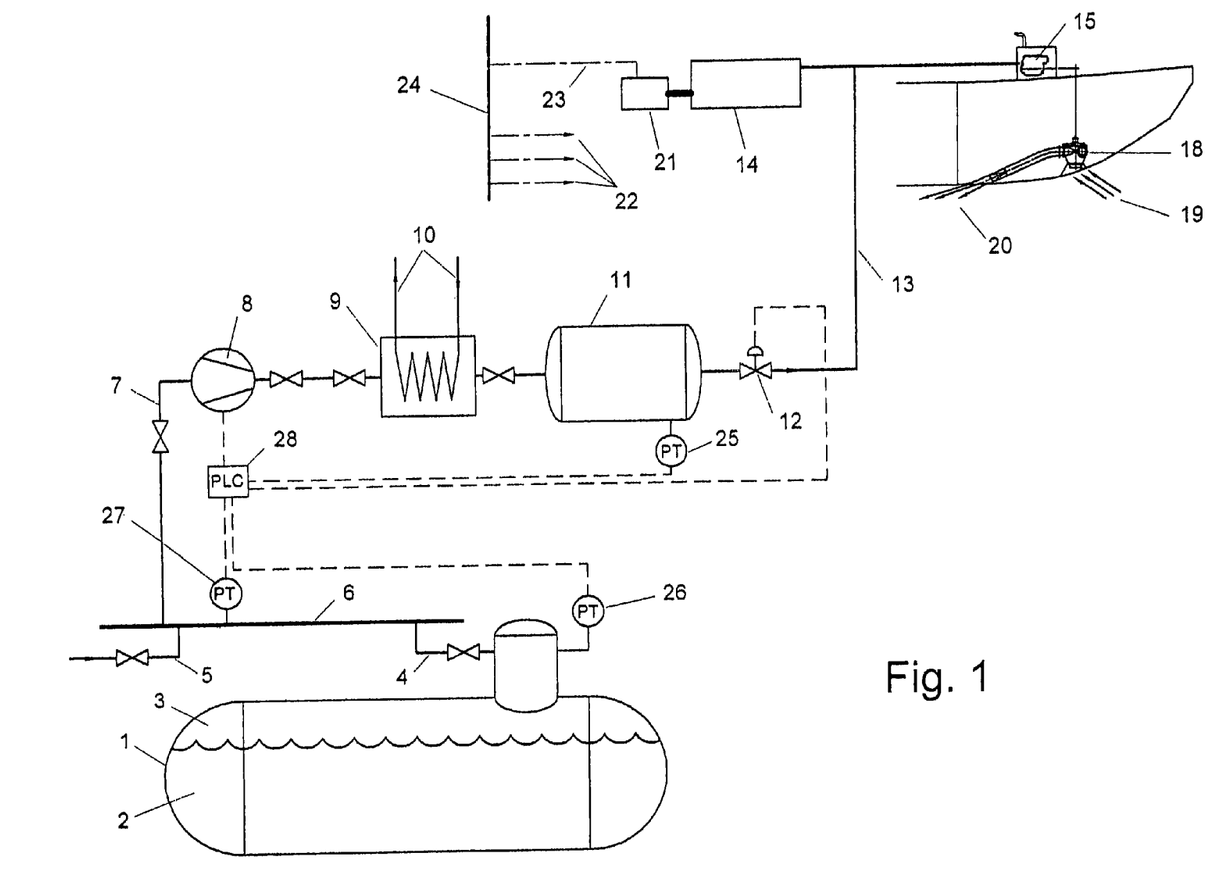
FIG. 1 shows a system diagram of one non-limiting embodiment of a first method of the invention which utilizes a natural gas burning bow thruster prime mover.
Figure 1A:
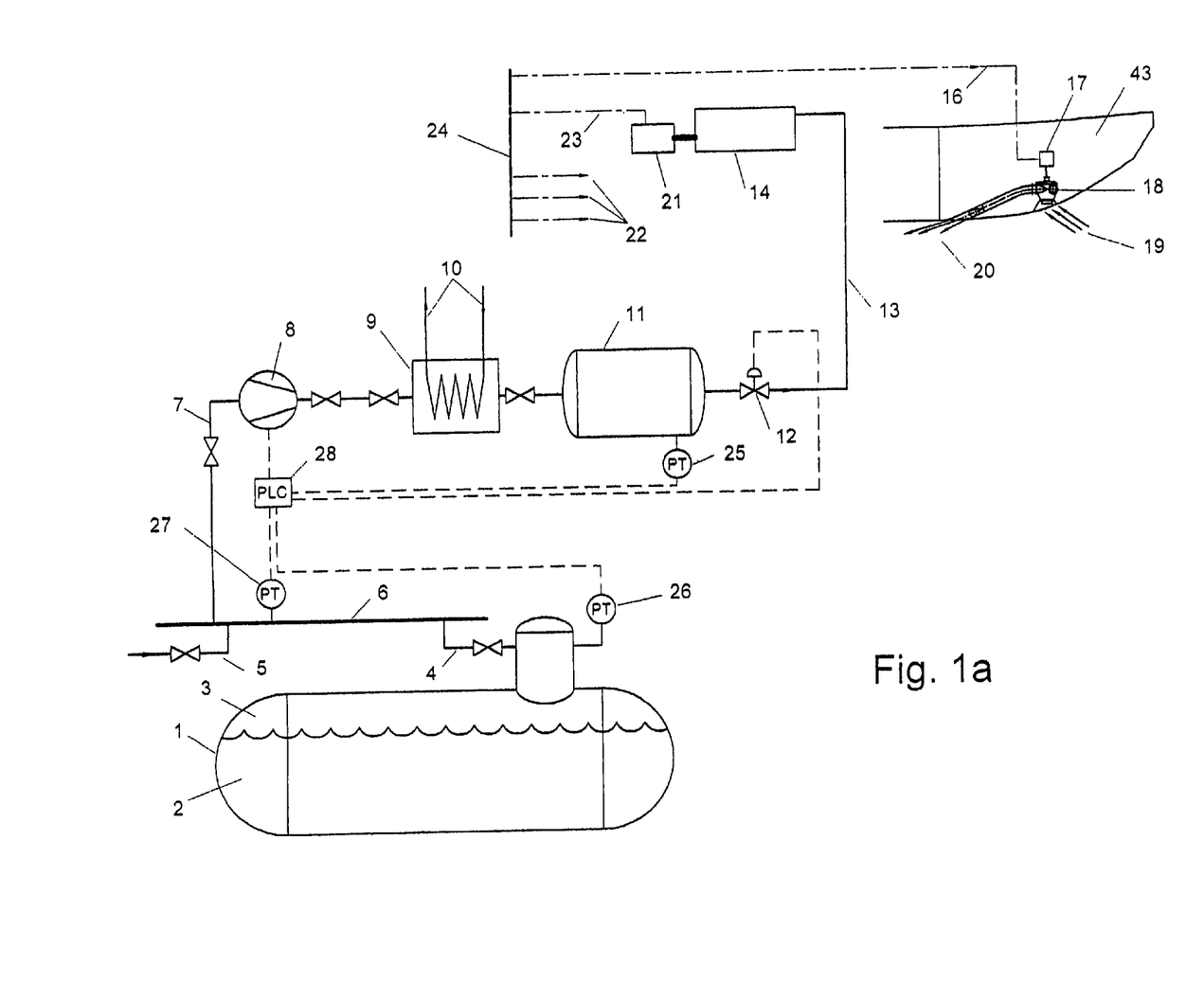
FIG. 1a shows a system diagram of another non-limiting embodiment of the first method utilizing natural gas burning electric generator prime movers along with an electric motor bow thruster prime mover.

FIGS. 1 & 1a provide further details of the above-noted first method and will be described in detail in the Detailed Description Section, herein.

A second non-limiting example of a method according to the invention can be described as follows. The amount of boil off gas that must be disposed of can be significantly reduced if a portion of the boil off gas can be re-condensed back to LNG and returned to the LNG cargo tanks. The second method is a refinement of the first method wherein a portion of the boil off gas is returned to the LNG cargo tanks as re-condensed LNG with the balance of the boil off gas compressed and heated and sent to appropriate gas consumers as described in the first method.

According to the second method, cold LNG boil off gas (vapor) is withdrawn from the LNG cargo tank(s) on the barge by a high pressure boil off gas compressor increasing the pressure of the gas. The preferred compressor is a single stage centrifugal type, alternately a reciprocating compressor may be utilized. Final choice of the most preferred compressor type will depend on the ultimate engineering solution for a particular application of the instant invention depending on the discharge pressure and flow rate of the compressor based on a total system heat balance calculation. The high pressure gas exiting the compressor is passed through a heat exchanger/boil off gas condenser, the preferred heat exchanger/condenser is of the shell and tube type in a vertical orientation, alternately a bayonet type exchanger can be utilized as well as other configurations on the high pressure side. As the high pressure LNG boil off gas passes through the heat exchanger/condenser, it is cooled and the gas is re-condensed to LNG as a result of the higher saturation temperature of the higher pressure gas. The re-condensed LNG is returned to the LNG cargo tank(s) where it is further cooled by the low temperature of the vapor space of the LNG cargo tank and subsequently expanded and reduced to cargo tank pressure by passing through spray nozzles (arrangement and type depends on the final engineering solution) arranged internal to the LNG cargo tank(s) in a pattern to provide uniform distribution of the LNG within the LNG cargo tank(s) in the vapor space of the tank. The resulting Joule-Thompson cooling effect of this expansion at the spray nozzles further cools the tank vapor space and results in further re-condensing of LNG and reduction of cargo tank pressure.

Additional boil off gas is withdrawn from the LNG cargo tank(s) and passed through the aforementioned heat exchanger/boil off gas condenser on the low pressure side, then to the suction side of a low pressure boil off gas compressor The preferred compressor is a single stage centrifugal type, alternately a reciprocating compressor may be utilized. It is this colder boil off gas, taken directly from the LNG cargo tanks, that provides the necessary cooling to re-condense the high pressure boil off gas back to a liquid (LNG). From the compressor the boil off gas is sent to a heater (preferred method is by shell and tube heat exchanger heaters where the heat source is provided by the waste heat, either from jacket water coolant or exhaust gas, from the gas consuming prime movers by utilizing an intermediate heat transfer fluid (water, oil, glycol, etc.)) to raise the gas temperature to atmospheric/ambient temperature. The temperature of the gas exiting the heater is controlled by measuring the temperature of the gas exiting the heater and controlling the heat transfer fluid flow into the heater. From the heater the gas enters a buffer tank and is subsequently sent to the gas consumers on the vessel. The buffer tank is a non-cryogenic, pressure vessel tank. The size and pressure rating of tank to be determined based on an engineering solution and the gas flow capacities of the gas consuming prime movers, in any case the tank need only be large enough to accommodate expected system flow variations and control system lag. The process from the low pressure boil off gas compressor to the gas consumers of the vessel is identical to the process described with regard to the first method.

Figure 2:
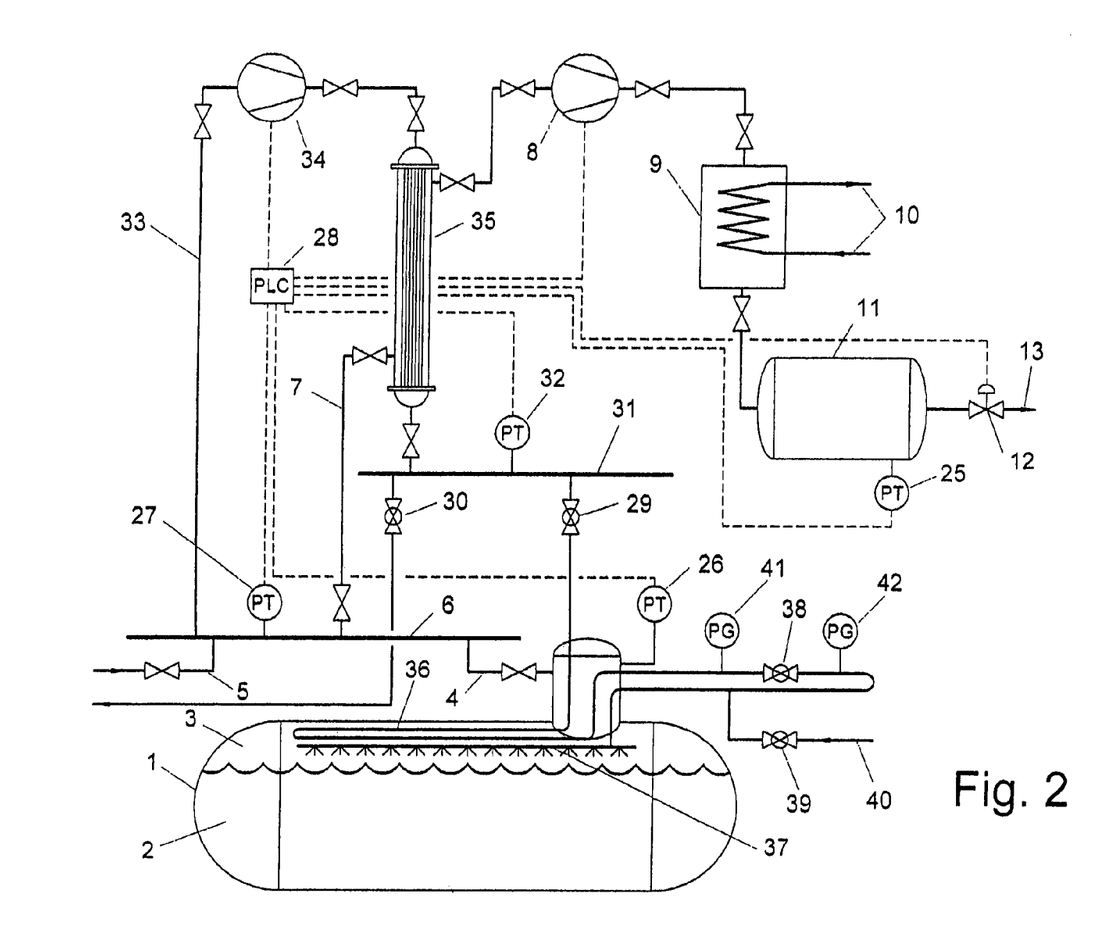
FIG. 2 shows a system diagram of another non-limiting embodiment of the first method.

FIG. 2 provides further detail of the second method and will be described in detail in the Detailed Description Section, herein.

A third non-limiting example of a method according to the invention can be described as follows. As previously stated, self-propelled LNG carriers use the boil off gas produced by the inevitable evaporation of the LNG cargo to provide fuel for the vessel propulsion. The propulsion fuel demand of a self propelled LNG carrier exceeds the naturally produced volume of boil off gas produced such that the burning of the boil off gas for propulsion power results in sufficient boil off gas being consumed that effective cargo tank pressure control can be achieved.

U.S. Pat. No. 2,795,937 discussed above seeks to achieve the same effect by utilizing the boil off gas produced in a liquefied gas barge as fuel to power the associated tugboat. However, as has been stated herein, transferring the gas from the barge to the tug via a hose while towing the barge, as taught in U.S. Pat. No. 2,795,937, is impractical and potentially hazardous.

It is common practice in the industry for a tugboat to push a barge from astern. The barge is often fitted with a notch allowing the tugboat's bow to fit securely into the notch. The tugboat is typically held in the notch by heavy towing wires between the tugboat and the barge. In this arrangement the tugboat and the barge are held in close proximity to each other, which would allow a flexible hose to deliver boil off gas to the propulsion engines of the tugboat to provide required propulsive power. In this manner, sufficient boil off gas can be effectively consumed to provide effective cargo tank pressure control at any desired equilibrium pressure to allow delivery of the LNG cargo at the desired LNG equilibrium temperature.

This method of securing the tugboat to the barge is only useable in relatively calm seas, however. In more severe weather and sea conditions it is necessary for the tugboat to exit the notch of the barge and tow the barge by conventional tow lines. This is due to the relative motion of the tugboat to the barge. In such situations it would be necessary to terminate the burning of the boil off gas in the tugboat's engines and the resulting loss of cargo tank pressure control.

A recent development in the tug and barge industry is the use of a mechanical connection arrangement between the tugboat and the notch in the aft end of the barge in a manner that restricts the relative motion between the tugboat and the barge in multiple degrees, typically only allowing the tug to move relative to the barge in the pitch axis only. Such systems have come to be known as Integrated Tug Barge (ITB) and Articulated Tug Barge (ATB) systems.

By utilizing such a connection system, it has been consistently and repeatedly demonstrated that it is not necessary for the tugboat to disengage from the barge and exit the notch in most normally encountered weather conditions, even during severe winter storms. By using this form of tugboat barge connection system burning the boil off gas in the tugboat's engines becomes a practical method of cargo tank pressure and temperature control.

A significant problem, however, is encountered when using boil off gas as propulsion fuel. Typically the fuel requirements for the tugboat will exceed the available boil off gas from the LNG cargo tanks of the barge. This necessitates that the additional energy must come from auxiliary fuel, which in turn requires the use of engines for main propulsion that are capable of burning both natural gas and conventional oil fuels at the same time in varying ratios. Attempts to accomplish this mode of operation have resulted in very complicated control systems and have proven to be significantly less reliable.

In the approach described herein, this problem is solved by equipping the tugboat with electric motor propulsion prime movers versus driving the propeller(s) directly from the engines themselves. Electric power is provided either from fuel oil burning engines driving electric generators fitted on the tugboat or by natural gas burning engines burning boil off gas fitted on the LNG barge or by a combination of both. The electric power generated on the barge is transferred to the tugboat by flexible electric cables.

This approach has a number of distinct advantages:
Natural gas is restricted to the barge only, eliminating the hazards associated with transferring and/or introducing natural gas aboard or onto the tugboat from the barge and specifically the engine room of the tugboat.
The engines on the barge burning natural gas are not required to burn combined fuels in varying ratios which provides for simpler controls and greatly increased reliability.
Similarly, the engines on the tugboat burn traditional fuel oil only.
The power generated by the natural gas burning engine(s) fitted on the LNG barge is limited to the power available from burning available boil off gas only, thereby maximizing LNG cargo delivery. The additional power required to meet the demands of the tugboat's electric propulsion motors, as well as other electric power demands, can be provided, as needed, by the tugboat's fuel oil burning engines.
If the tugboat must disconnect and exit from the notch on the barge for whatever reason, full power is available from the fuel oil burning generator engines installed on the tugboat.

Similarly, a failure of the generators on the LNG barge, for whatever reason, is easily accommodated by the fuel oil burning generators on the tugboat assuming all power demands.

Figure 3:
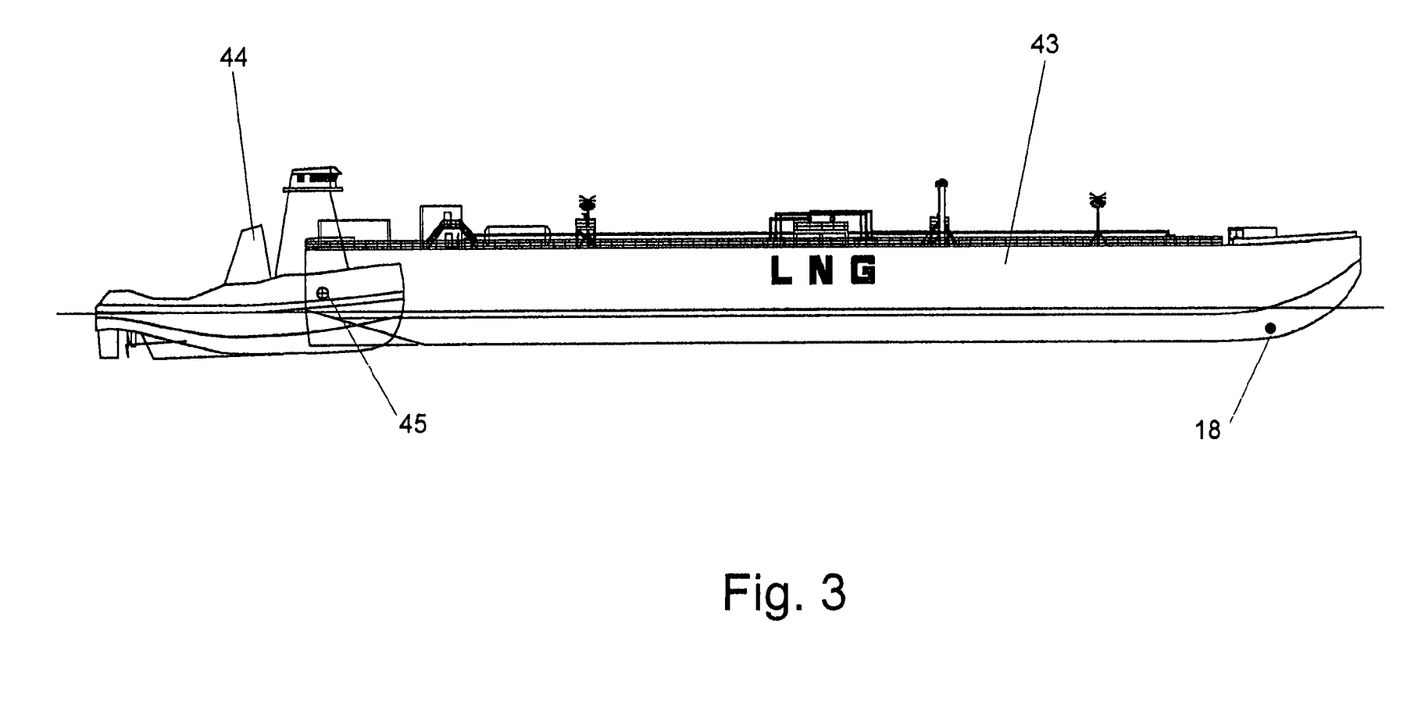
FIG. 3 shows a profile view of typical tugboat and LNG barge in a pusher operational mode.
Figure 4:
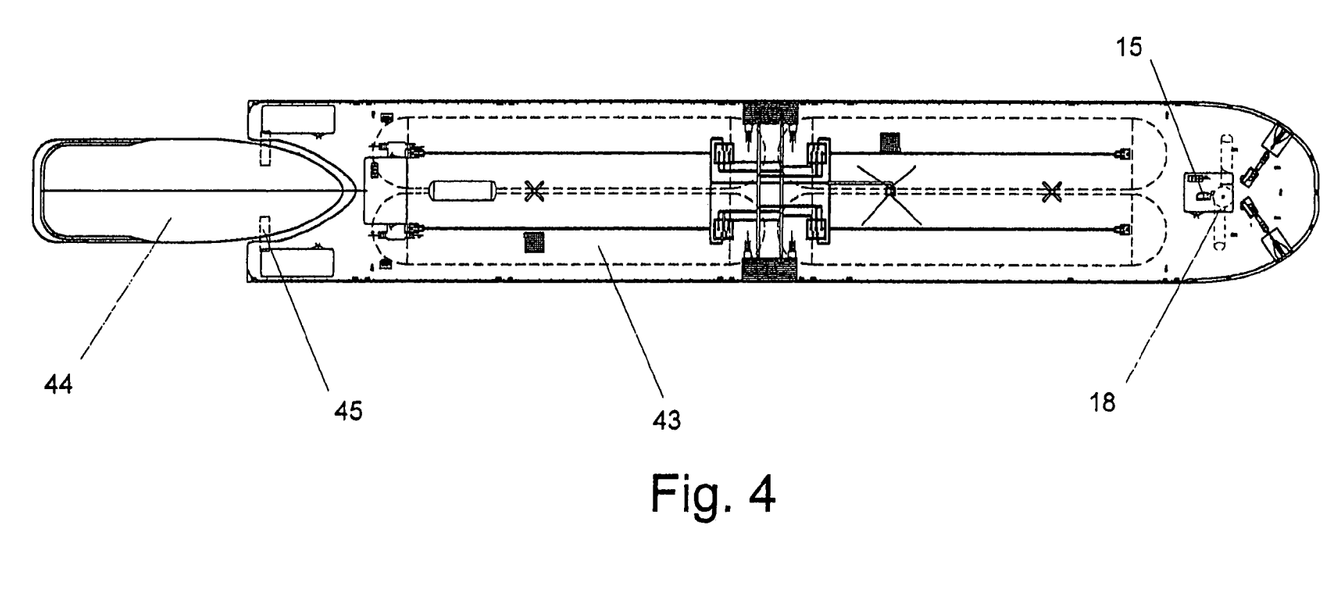
FIG. 4 shows a plan view of typical tugboat fitted to a notch in the aft section of an LNG barge.
Figure 5:
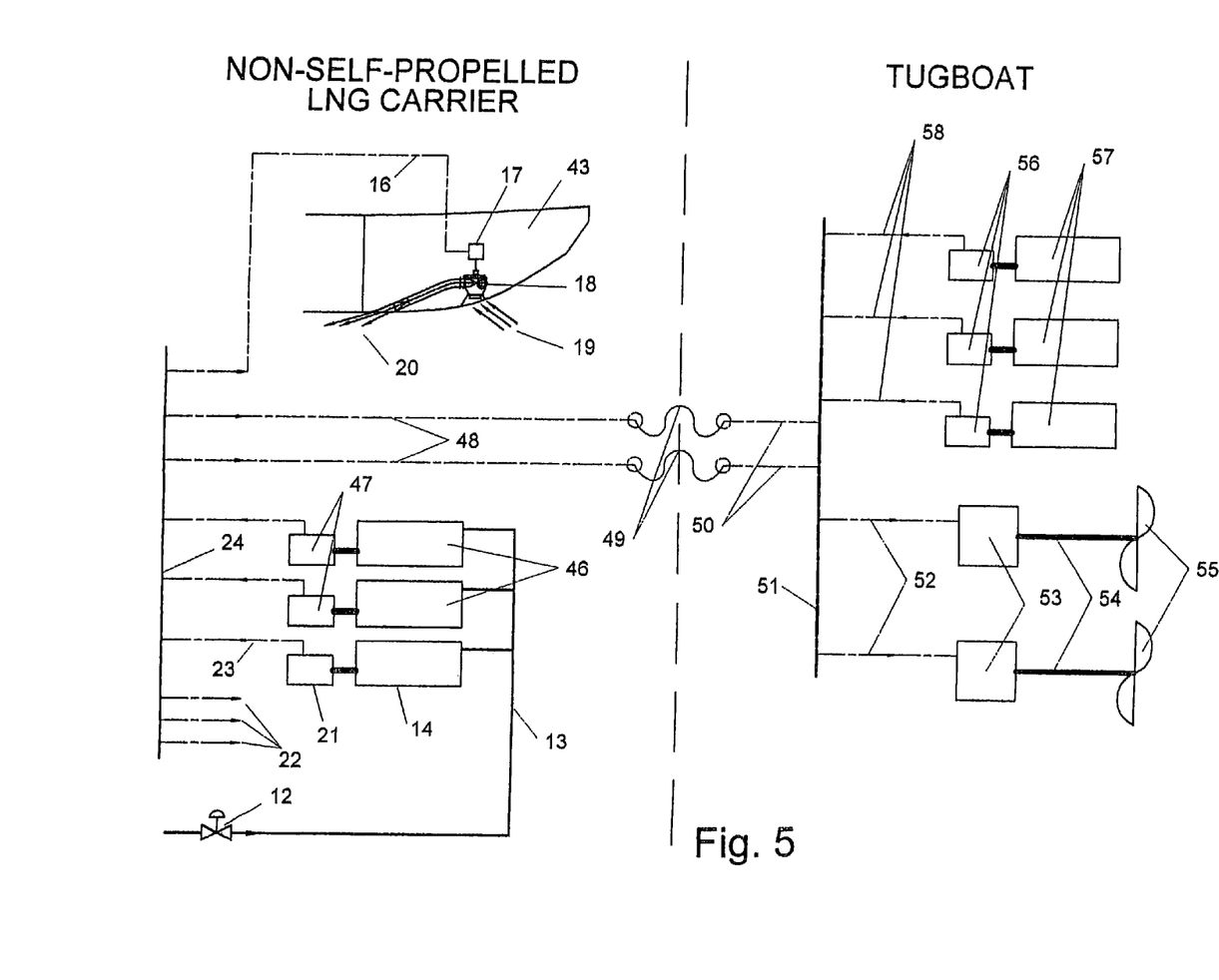
FIG. 5 shows a system diagram of tugboat propulsion power being produced by burning boil off gas on the LNG barge.

FIGS. 3, 4 and 5 provide further details of the third method and are described in detail in the Detailed Description Section, herein.

The invention also provides for a method of operating a marine liquefied natural gas (LNG) carrier in which LNG is carried in at least one tank, wherein the method comprises removing gas generated by evaporation of the LNG within the at least one tank, feeding the gas to at least one gas consuming prime mover of the LNG carrier, and providing power, with the at least one gas consuming prime mover, to at least one thruster. The at least one thruster is capable of consuming full power at all times notwithstanding actual thrust requirements of the LNG carrier.

The method may further comprise controlling pressure in the at least one tank by removing gas generated by natural evaporation of the LNG within the at least one tank.

The method may further comprise, before the feeding, processing the gas.

The at least one thruster may comprise a water jet thruster mounted to the LNG carrier. The LNG carrier may comprise a non-self-propelled LNG carrier. The at least one tank may comprise an insulated pressure vessel. The at least one tank may comprise an insulated non-pressure vessel. The LNG may be stored in the at least one insulated tank at a specified equilibrium vapor pressure and temperature.

The method may further comprise processing the gas to a required pressure and temperature.

The at least one gas consuming prime mover may comprise a plurality of gas consuming prime movers fitted to the LNG carrier.

The method may further comprise at least one of at least one of the plurality of gas consuming prime movers generates electric power, and at least one of the plurality of gas consuming prime movers consumes gas in addition to the gas consumed by the at least one gas consuming prime mover.

The at least one tank may comprise a plurality of insulated tanks and the LNG carrier may comprise a pressure vessel LNG carrier. The gas may be generated by natural evaporation of LNG within the at least one tank due to heat leakage.

The method may further comprise at least one of accumulating a portion of the gas that is not consumed by the at least one gas consuming prime mover, storing a portion of the gas that is not consumed by the at least one gas consuming prime mover, accumulating in at least one other tank a portion of the gas that is not consumed by the at least one gas consuming prime mover, and storing in at least one other tank a portion of the gas that is not consumed by the at least one gas consuming prime mover.

The method may further comprise accumulating in a tank a portion of the gas that is not consumed by the at least one gas consuming prime mover and decreasing a pressure within the tank over time.

The method may further comprise accumulating in a tank a portion of the gas that is not consumed by the at least one gas consuming prime mover and increasing a pressure within the tank over time.

The invention also provides for a method of operating a marine liquefied natural gas (LNG) carrier in which LNG is carried in at least one tank, wherein the method comprises removing gas generated by evaporation of the LNG within the at least one tank, feeding the gas to at least one gas consuming prime mover of the LNG carrier, increasing a pressure of a first portion of the gas, re-liquefying the first portion of the gas and feeding the first portion of the gas to spray nozzles arranged within the at least one tank.

The LNG carrier may comprise a non-self-propelled LNG carrier. The at least one tank may comprise at least one of an insulated pressure vessel and an insulated non pressure vessel, whereby the at least one tank is capable of storing the LNG at a specified equilibrium vapor pressure and temperature.

The method may further comprise controlling a pressure in the at least one tank by removing the gas generated by the evaporation of LNG within the at least one tank.

The increasing a pressure of a first portion of the gas may comprise compressing the first portion of the gas, whereby the first portion of the gas is made suitable for re-condensation by cooling.

The method may further comprise exchanging heat between the first portion of the gas and a second portion of the gas, whereby the second portion of the gas is in an un-compressed state.

The method may further comprise cooling the first portion of the gas by exchanging heat between the first portion of the gas and boil off gas contained within a vapor space of the at least one tank.

The method may further comprise cooling and re-condensing the compressed first portion of the gas while simultaneously heating a second un-compressed portion of the gas.

The method may further comprise exchanging heat between the first portion of the gas and a second un-compressed portion of the gas and processing a second un-compressed portion of the gas after heat exchange with the first portion of the gas.

The method may further comprise, after the increasing, cooling the first portion of the gas by exchanging heat between the first portion of the gas and boil off gas contained within a vapor space of the at least one tank.

The spray nozzles may be arranged within a vapor space of the at least one tank.

The method may further comprise at least one of expanding, after the feeding, the first portion of the gas in a vapor space of the at least one tank, cooling, after the feeding, the first portion of the gas in a vapor space of the at least one tank, and condensing, after the feeding, the first portion of the gas in a vapor space of the at least one tank.

The at least one tank may comprise a plurality of insulated tanks. The LNG carrier may comprise a non-self-propelled pressure vessel LNG carrier.

The method may further comprise at least one of accumulating some of the gas that is not consumed by the at least one gas consuming prime mover, storing some of the gas that is not consumed by the at least one gas consuming prime mover, accumulating in at least one tank some of the gas that is not consumed by the at least one gas consuming prime mover, and storing in at least one tank some of the gas that is not consumed by the at least one gas consuming prime mover.

The method may further comprise accumulating in a tank some of the gas that is not consumed by the at least one gas consuming prime mover and decreasing a pressure within the tank over time.

The method may further comprise accumulating in a tank some of the gas that is not consumed by the at least one gas consuming prime mover and increasing a pressure within the tank over time.

The method may further comprise at least one of accumulating in the at least one tank some of the gas that is not consumed by the at least one gas consuming prime mover and storing in the at least one tank some of the gas that is not consumed by the at least one gas consuming prime mover.

The method may further comprise accumulating in the at least one tank some of the gas that is not consumed by the at least one gas consuming prime mover and decreasing a pressure within the at least one tank over time.

The method may further comprise accumulating in the at least one tank some of the gas that is not consumed by the at least one gas consuming prime mover and increasing a pressure within the at least one tank over time.

The invention also provides for a method of operating a marine liquefied natural gas (LNG) carrier in which LNG is carried in at least one tank, wherein the method comprises removing gas generated by evaporation of the LNG within the at least one tank, feeding the gas to at least one gas consuming prime mover of the LNG carrier, providing power, with the at least one gas consuming prime mover, to at least one electric generator mounted to the LNG carrier, and supplying electrical current from the at least one generator to at least one electric propulsion motor of a tugboat. The tugboat provides propulsion to the LNG carrier.

The LNG carrier may comprise a non-self-propelled marine LNG carrier. The at least one tank may comprise at least one of an insulated pressure vessel tank and at least one insulated non pressure vessel tank, whereby the at least one tank is capable of storing the LNG at a specified equilibrium vapor pressure and temperature.

The method may further comprise controlling a pressure in the at least one tank by removing the gas generated by the evaporation of LNG within the at least one tank.

The method may further comprise processing the gas to a designated pressure and temperature.

The at least one gas consuming prime mover may comprise a plurality of gas consuming prime movers.

The method may further comprise providing with the plurality of gas consuming prime movers power to operate the at least one electric generator.

The method may further comprise connecting the at least one electric generator to the tugboat via flexible cables.

The method may further comprise connecting with at least one flexible cable the at least one electric generator and the at least one electric propulsion motor of the tugboat.

The at least one electric propulsion motor of the tugboat may comprise a plurality of electric propulsion motors which utilize electric power provided by the at least one generator of the LNG carrier. The tugboat may engage a notch arranged in a stern of the LNG carrier and provides propulsion power by pushing from astern.

The method may further comprise connecting the tugboat semi-rigidly to the LNG carrier, whereby relative motion between the tugboat and the LNG carrier is prevented in at least one axis. The at least one axis may comprise a roll axis.

The method may further comprise condensing at least a portion of the gas.

The invention also provides for a method of operating a marine liquefied natural gas (LNG) carrier in which LNG is carried in at least one tank, wherein the method comprises removing gas generated by evaporation of the LNG within the at least one tank, feeding the gas to at least one gas consuming prime mover of the LNG carrier, providing power, with the at least one gas consuming prime mover, to at least one electric generator arranged on the LNG carrier, and supplying electrical current from the at least one generator to a tugboat via at least one flexible cable.

The LNG carrier may comprise a non-self-propelled marine LNG carrier. The at least one tank may comprise at least one insulated tank capable of storing LNG at a specified equilibrium vapor pressure and temperature.

The method may further comprise controlling a pressure in the at least one tank by removing the gas generated by the evaporation of LNG within the at least one tank.

The method may further comprise, before the feeding, processing the gas to a predetermined pressure and temperature.

The at least one generator may comprise a plurality of electric generators mounted within the LNG carrier. The at least one flexible cable may comprise a plurality of flexible cables. The tugboat may engage a notch arranged in a stern of the LNG carrier to provide propulsion power by pushing from astern.

The method may further comprise connecting the tugboat semi-rigidly to the LNG carrier, whereby relative motion between the tugboat and the LNG carrier is prevented in at least one axis. The at least one axis may comprise a roll axis.

The method may further comprise condensing at least a portion of the gas.

The invention also provides for a marine liquefied natural gas (LNG) carrier comprising at least one tank storing the LNG, at least one LNG gas consuming prime mover providing power to at least one thruster, an arrangement for removing gas generated by evaporation of the LNG within the at least one tank, an arrangement for feeding the gas to the at least one gas consuming prime mover, the least one thruster consuming full power of the at least one gas consuming prime mover at all times notwithstanding actual thrust requirements of the LNG carrier.

The LNG carrier may further comprise an arrangement for controlling pressure in the at least one tank by removing gas generated by natural evaporation of the LNG within the at least one tank.

The at least one thruster may comprise a water jet thruster mounted to the LNG carrier and wherein the LNG carrier comprises a non-self-propelled LNG carrier. The at least one tank may comprise an insulated tank.

The LNG carrier may further comprise an arrangement for processing the gas to a predetermined pressure and temperature.

The at least one gas consuming prime mover may generate electric power. The at least one gas consuming prime mover may comprise a first prime mover driving the at least one thruster and a second prime mover driving at least one generator which provides electric current.

The invention also provides for a marine liquefied natural gas (LNG) carrier comprising at least one tank storing the LNG, at least one LNG gas consuming prime mover, an arrangement for removing gas generated by evaporation of the LNG within the at least one tank, an arrangement for feeding the gas to the at least one gas consuming prime mover, an arrangement for increasing a pressure of a first portion of the gas, an arrangement for re-liquefying the first portion of the gas, and an arrangement for feeding the first portion of the gas to spray nozzles arranged within the at least one tank.

The invention also provides for a marine liquefied natural gas (LNG) carrier comprising at least one tank storing the LNG, at least one LNG gas consuming prime mover, at least one electric generator mounted to the LNG carrier, an arrangement for removing gas generated by evaporation of the LNG within the at least one tank, an arrangement for feeding the gas to the at least one gas consuming prime mover. The at least one gas consuming prime mover provides power to the at least one electric generator. The at least one generator is structured and arranged to supply electrical current to at least one electric propulsion motor of a tugboat when the tugboat provides propulsion to the LNG carrier.

The LNG carrier may further comprise at least one flexible cable supplying the electrical current from the at least one generator to the at least one electric propulsion motor of the tugboat, wherein the electrical current meets at least a portion of the electric power demands of the tugboat when the tugboat is providing propulsion power to move the LNG carrier through water. If the electrical current supplied from the LNG carrier is not sufficient to meet all of the power demands of the tugboat, the additional power is supplied by fuel oil powered generators on the tugboat.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 shows a first non-limiting arrangement according to the invention. Liquid Natural Gas (LNG) 2 is contained in one or more insulated LNG tank(s) 1. The insulated tanks maybe of the pressure vessel type such as cylindrical or multi-lobe tanks as is common for pressurized liquefied gas carriers or of the non-pressure vessel primatic type liquefied gas tanks. As heat leaks into the LNG 2 through the insulated tank walls of the LNG tank 1, boil vapor is generated which fills the vapor space 3 of tank 1. The LNG tank 1 may be either a pressure vessel type tank, able to withstand a pressure significantly above atmospheric or a non-pressure vessel tank that must be maintained at a pressure substantially equal to atmospheric pressure. Preferably, the tank 1 is a pressure vessel type tank that can withstand the pressure generated by the LNG cargo 2 as a result of heat leakage over time for a period of time suitable for the intended trade route and in accordance with regulatory agency requirements with all tank valves closed and the tank 1 isolated.

The normal temperature of the LNG 2 at substantially atmospheric pressure and of typical composition is approximately −260° F. The normal temperature of the boil off gas and the vapor space 2 of tank 1 is approximately −220° F. or higher depending on the type of tank insulation and insulation efficiency employed.

One or more insulated pipeline(s) 4 and associated block valves (any number of different types of valves can be used) provide for the removal of the boil off gas from the vapor space 3 of tank 1 and covey the boil off gas to an insulated boil off gas pipeline header 6. One or more other insulated pipeline(s) 7 and associated block valves provide for the conveyance of the cold boil off gas to the suction side of the low pressure boil off compressor 8 from the boil off gas pipeline header 6. The most preferred type of compressor is a centrifugal rotary type. However, reciprocating and multi-lobe compressors can also be utilized.

One or more other insulated pipeline(s) 5 and associated block valves provide for the connection of a second LNG cargo tank to the boil off gas pipeline header 6, and so on. A multitude of LNG cargo tanks can be similarly connected by additional pipeline(s).

The boil off gas at the suction side of low pressure boil off compressor 8 is typically at a temperature of approximately −220° F., or higher and a pressure of between approximately 15.5 psia to approximately 16.0 psia.

The low pressure boil off compressor 8 raises the pressure of the boil off gas to a pressure suitable for, and as required by, the natural gas consuming prime movers 14 and/or 15 fueled by the boil off gas. Typical boil off gas pressure required will be on the order of between approximately 20 psia to approximately 30 psia.

The discharge side of the low pressure boil off compressor 8 is connected by one or more other insulated pipeline(s) and associated block valves to a boil off gas heater 9. The preferred heater is a shell and tube heater. However, flat plate or bayonet tube types can also be utilized. The boil off gas is heated in a boil off gas heater 9 to near ambient atmospheric temperature to prevent damage to downstream equipment from cryogenic temperatures (ambient conditions would dictate the requisite values and any useful method of control can be utilized). Boil off gas heater 9 is fed with a suitable heating medium 10 such as a water glycol mixture, oil or other commercial heat transfer fluids heated from an appropriate heat source, such as available engine waste heat. Alternatively, a dedicated oil or gas fired heater can be used. In the preferred embodiment the heating medium 10 is heated by waste heat from the cooling system(s) of the gas consuming prime movers 14 and/or 15.

From the boil off heater 9 the heated boil off gas, or fuel gas, which at this point is at approximately 70° F. and between approximately 20 psia and approximately 30 psia (or as otherwise required), is conveyed by appropriate pipelines and valves to a boil off gas buffer tank 11 which can simply be a carbon steel, non cryogenic, pressure vessel. The fuel gas buffer tank 11 provides for short term gas storage to accommodate short duration changes in gas demand.

From the boil off gas buffer tank 11 the gas is conveyed by appropriate pipelines to master gas valve 12 which provides positive system shut down of gas to the gas consuming prime movers 14 and 15 as is required by applicable regulations. Fuel gas pipeline 13 provides for distribution of fuel gas to the gas consuming prime movers 14 and 15.

Programmable Logic Controller (PLC) 28 provides for automatic system control based on inputs from an LNG cargo tank vapor space pressure transmitter 26, common boil off gas pipeline header 6 pressure transmitter 27 and fuel gas buffer tank pressure transmitter 25. The PLC 28 provides control signals to the low pressure boil off gas compressor 8 and the master gas block valve 12.

The PLC 28 controls the flow through the low pressure boil off gas compressor 8 by maintaining the pressure in the common boil off gas pipeline header 6 and buffer tank 11 within desired pressure limits as required by the gas consuming prime mover. Additionally, if the vapor space 3 of cargo tank 1, as monitored by LNG cargo tank vapor space pressure transmitter 26, goes below a desired minimum pressure, atmospheric pressure for instance, the boil off gas flow through the low pressure boil off compressor 8 is reduced or stopped as appropriate. If the pressure in the fuel gas buffer tank 11 rises above a desired value, based on requirements of the gas consuming prime mover or the working pressure of the buffer tank 11 as monitored by fuel gas buffer tank pressure transmitter 25, the boil off gas flow through the low pressure boil off compressor 8 is reduced or stopped. Similarly, if the pressure in the buffer tank 11 decreases, the flow through the low-pressure boil off compressor 8 is increased. If the pressure in the boil off gas pipeline header 6 decreases below a desired and predetermined pressure, typically 15.4 to 16.5 psia, the flow through the low-pressure boil off compressor 8 is reduced or stopped. At anytime that the system described is not operating, or if any system parameters exceed critical values, PLC 28 stops the low-pressure boil off gas compressor 8 and shuts or closes the master gas valve 12. If the master gas valve 12 is shut manually or automatically as a result of an outside shut down signal such as from a vessel emergency shut down (ESD) system, the PLC 28 stops the low pressure boil off gas compressor 8.

The amount of boil off gas removed from the vapor space 3 of tank 1 is governed by the amount of gas consumed by gas consuming prime movers 14 and 15.

Prime mover 15 supplies power to one or more water jet type bow thruster(s) 18 through a direct mechanical arrangement, such as a drive shaft. The thruster 18 is mounted in the forward part of the LNG barge 43. The thruster 18 takes in water 19 through the bottom of barge 43 and discharges a high velocity water stream either to the port and/or starboard sides of the barge 43 or aft through the bottom of barge 43 to provide forward propulsion 20. If no thrust is required or desired for either propulsion or maneuvering of the LNG barge 43, the thrust of the thruster 18 is directed equally to port and starboard sides of the barge 43 thereby providing a net thrust of zero (0) but still consuming full power of the thruster and maximum consumption of boil off/fuel gas by the thruster gas consuming prime mover 15, thereby maintaining effective and useful LNG cargo tank 1 pressure control regardless of barge maneuvering/propulsion requirements. The thrust direction of the thruster is controlled by the tugboat captain by remote control from the pilot house of the tug.

Further boil off gas/fuel gas consumption is afforded by utilizing a gas consuming prime mover 14 for one or more generators 21. In this way, the electric demand loads of the LNG barge are met by consuming boil off/fuel gas, further improving LNG cargo tank 1 pressure control capability. The generator 21 provides power to a main switchboard buss 24 through one or more input electric feeder cables 23. This power is in turn available for use via one or more output electric feeder cables or distribution feeder circuits 22.

FIG. 1a shows a second non-limiting arrangement according to the invention. The arrangement is similar to that of FIG. 1 except that the gas burning prime mover 15 is eliminated and replaced with an appropriate electric motor prime mover 17 to provide required power to thruster 18. Electric power is provided to the thruster electric motor prime mover 17 by an electric generator 21 feeding the main switchboard buss 24 and through an electric feeder cable 16 to prime mover 17. The gas burning prime mover 14 provides power to electric generator 21. All other functions of the system/arrangement are the same as those discussed above with regard to FIG. 1, and will not be described again.

FIG. 2 shows a third non-limiting arrangement according to the invention. The Liquid Natural Gas (LNG) 2 is contained in insulated tank(s) 1. The tank 1 can be of the same type as described above with regard to FIG. 1. As heat leaks into the LNG 2 through the insulated walls of the tank 1, boil vapor is generated and fills a vapor space 3 of tank 1. The LNG tank 1 may be either a pressure vessel type tank able to withstand a pressure significantly above atmospheric or a non-pressure vessel type tank that must be maintained at a pressure substantially equal to atmospheric pressure. The preferred embodiment is a pressure vessel type tank that can withstand the pressure generated by the LNG cargo 2 as a result of heat leakage over time for a period appropriate to the intended trade route and voyage length and in accordance with applicable regulations with all tank valves closed and the tank 1 isolated.

The normal temperature of the LNG 2 at substantially atmospheric pressure and of typical composition is approximately −260° F. The normal temperature of the boil off gas and the vapor space 2 of tank 1 is approximately −220° F. or higher depending on type, quantity and efficiency of the insulation system.

One or more insulated pipeline(s) 4 and associated block valves provide for the removal of the boil off gas from the vapor space 3 of tank 1 and coveys the boil off gas to an insulated boil off gas pipeline header 6. One or more insulated pipeline(s) 7 and associated block valves provide for the conveyance of the cold boil off gas to an inlet and/or low pressure side of a boil off gas condenser 35 the preferred condenser heat exchanger type is a simple shell tube type suitable for cryogenic temperatures, other heat exchanger types may be utilized from the boil off gas pipeline header 6.

One or more insulated pipeline(s) 5 and associated block valves provide for the connection of a second LNG cargo tank to the boil off gas pipeline header 6. Additional pipelines can similarly connect a multitude of LNG cargo tanks.

One or more insulated pipeline(s) 33 and associated block valves provide for the conveyance of the cold boil off gas to a suction side of the high pressure boil off compressor 34. The compressor may be of the centrifugal axial flow type, multi lobe rotary type, reciprocating type or other compressor suitable for cryogenic service and is capable of developing the required pressure to allow for the gas to be re-liquefied in the condenser 35, from the boil off gas pipeline header 6.

The boil off gas at the suction side of high pressure boil off compressor 34 is typically at a temperature of approximately −220° F. and a pressure of between approximately 15.5 psia and approximately 16.0 psia.

The high pressure boil off compressor 34 raises the pressure of the boil off gas to a pressure wherein when cooled by the low pressure boil off gas in the low pressure side of boil off condenser 35, the high pressure boil off gas will re-condense to LNG. The actual pressure will depend on the composition of the LNG and other system parameters that will be identified during detailed system engineering and development of a heat balance specific to the individual gas flow rates. The high pressure boil off gas from the discharge of the high pressure boil off gas compressor 34 is conveyed by appropriate pipelines and valves to an inlet of the high pressure side of the boil off condenser 35. The high pressure boil off gas is re-condensed by the effect of counter flow heat exchange with colder low pressure boil off gas in the boil off gas condenser 35.

The re-condensed LNG from the boil off gas condenser 35 is conveyed by appropriate pipelines and valves to the re-condensed LNG pipeline header 31. The headers can have the form of pipes with multiple inlets and outlets. From the header 31, the re-condensed LNG is distributed by re-condensed LNG distribution control valve 29 to the LNG storage tank 1 via one or more appropriate insulated, cryogenic pipeline(s).

One or more distribution control valve(s) 30 provide for the return of re-condensed LNG to a second LNG cargo tank. Additional distribution control valves and associated pipelines can similarly connect a multitude of LNG cargo tanks.

The re-condensed LNG is then conveyed to a re-condensed LNG heat exchanger pipe 36 with high thermal transfer efficiency and compatible with the tank material, i.e., aluminum pipe with an aluminum tank, contained within the vapor space 3 of LNG tank 1. The re-condensed LNG heat exchanger pipe 36 is in direct contact with the cold boil off vapor contained within the vapor space 3. This provides heat exchange between the re-condensed LNG and the boil off vapor. The re-condensed LNG is thus further cooled by heat exchange with the cold vapor within the vapor space 3. From the heat exchanger pipe 36, the sub-cooled re-condensed LNG is conveyed to one or more spray nozzle control valve(s) 38, located external to and in close proximity to the LNG tank 1. From the spray nozzle control valve 38, the sub-cooled LNG is conveyed to a spray cooling header) and spray nozzles 37 contained within the vapor space 3 of LNG tank 1. The spray nozzles should be selected to provide an effective spray pattern based on the sub-cooled temperature of the LNG achieved and the LNG pressure at the spray nozzles. The spray nozzles could be as simple as appropriately sized holes in the header.

The sub-cooled re-condensed LNG is expanded from a higher pressure compressor 34 discharge pressure to the lower pressure typically 15.4 psia to 16.5 psia of the tank vapor space 3 through the spray nozzles 37. The subsequent cooling effect of the expansion and evaporation of at least part of the LNG through the spray nozzles 37 results in a cooling of the vapor space 3 and partial re-condensation of the LNG boil off vapor contained within vapor space 3. The resulting LNG thus returns to the LNG 2 stored in tank 1.

The spray nozzle control valve 38 allows for the control of the flow of re-condensed LNG to the spray nozzles 37 while maintaining appropriate back pressure as needed to maintain system equilibrium in the system between an outlet side of the high pressure boil off compressor 34 and the spray nozzle control valve 38 at each LNG tank 1. One or more pressure gauge(s) 41 provides an indication of the system back pressure to allow for the proper positioning of control valve 38. Control valve 38 is expected to be a manual valve that is adjusted infrequently to bring the system into equilibrium. Alternately, a more sophisticated arrangement can be utilized wherein control valve 38 is controlled automatically, but this may not be necessary. One or more pressure gauge 42 allows for monitoring the pressure at an upstream side of the spray nozzles 37. One or more control valve(s) 39 allows LNG from an appropriate source 40, such as from the loading terminal, to be directed to the spray nozzles 37 for cool down of the cargo tank 1 prior to, during, and/or loading of an LNG cargo. In this mode of operation, the control valve 38 is manually closed.

The re-condensed LNG distribution control valves 29 and 30 provide for a balancing of the flow of re-condensed LNG when multiple LNG tanks are fitted and/or utilized.

The low pressure boil off gas is conveyed, via appropriate pipelines and valves, from an outlet of the low pressure side of boil off gas condenser 35 to a suction side of the low pressure boil off gas compressor 8. The low pressure boil off gas compressor 8 provides the necessary pressure differential of approximately 2 to approximately 3 psig, typically, to allow the LNG boil off gas to flow from the vapor space 2 to the boil off gas header 6 and through the low pressure side of boil off gas condenser 35. The cold boil off gas stream flows in counter flow to the high pressure boil off gas stream within the boil off gas condenser 35 to cool and re-condense the high pressure boil off gas stream while raising the temperature (which would of course depend on final system design) of the low pressure boil off gas stream.

The low pressure boil off compressor 8 raises the pressure of the low pressure boil off gas stream to a pressure suitable to and as required by, the natural gas consuming prime movers 14 and/or 15 fueled by the boil off gas. Typical boil off gas pressure required will be on the order of between approximately 20 psia and approximately 30 psia.

A discharge side of the low pressure boil off compressor 8 is connected by one or more insulated pipeline(s) and associated block valves to the boil off gas heater 9. The boil off gas is heated in boil off gas heater 9 to near ambient atmospheric temperature to prevent damage to downstream equipment from cryogenic temperatures. Boil off gas heater 9 is fed with a suitable heating medium 10 heated from an appropriate heat source. According to at least one non-limiting preferred embodiment, the heating medium 10 is heated by waste heat from a cooling system(s) of one of more of the gas consuming prime movers, such as, e.g., prime movers 14 and/or 15 shown in FIGS. 1 and 1a.

From the boil off heater 9, the heated boil off gas, or fuel gas, at approximately 70° F. and between approximately 20 psia and approximately 30 psia (or as otherwise required), is conveyed by appropriate pipelines and valves to the boil off gas buffer tank 11. The fuel gas buffer tank 11 provides for short-term gas storage to accommodate short duration changes in gas demand.

From the boil off gas buffer tank 11, the gas is conveyed by appropriate pipelines to the master gas valve 12 which provides positive system shut down of gas to gas consuming prime movers, e.g., prime movers 14 and 15 shown in FIGS. 1 and 1a, as is required by applicable regulations. One or more fuel gas pipeline(s) 13 provides for distribution of fuel gas to the gas consuming prime movers, e.g., prime movers 14 and 15.

A programmable Logic Controller (PLC) 28 provides for automatic system control based on inputs from one or more LNG cargo tank vapor space pressure transmitter(s) 26, one or more common boil off gas pipeline header pressure transmitter(s) 27, one or more re-condensed LNG pipeline header pressure transmitter(s) 32, and one or more fuel gas buffer tank pressure transmitter(s) 25. The PLC 28 provides control signals to the high pressure boil off compressor 34, the low pressure boil off gas compressor 8, and the master gas valve 12.

The PLC 28 controls the flow through the high pressure boil off gas compressor 34 by maintaining the desired pressure (which would of course depend on final system design) in the re-condensed LNG pipeline header 31. Simultaneously, the PLC 28 controls the flow through low pressure boil off gas compressor 8 by maintaining the pressure in the common boil off gas pipeline header 6 and the buffer tank 11 within desired pressure limits as required by the gas consuming prime mover(s). Additionally, if the vapor space 3 of cargo tank 1, as monitored by LNG cargo tank vapor space pressure transmitter 26, goes below a desired minimum pressure typically atmospheric pressure, the boil off gas flow through the high pressure boil off gas compressor 34 and the low pressure boil off compressor 8 is reduced or stopped as appropriate. If the pressure in the fuel gas buffer tank 11 rises above a desired value, typically the maximum working pressure of the buffer tank 11 as monitored by fuel gas buffer tank pressure transmitter 25, the boil off gas flow through the low pressure boil off compressor 8 is reduced or stopped. Similarly, if the pressure in the buffer tank 11 decreases to the minimum pressure required by the gas consuming prime movers 14, the flow through the low-pressure boil off compressor 8 is increased. If the pressure in the boil off gas pipeline header 6 decreases below a desired and predetermined pressure, typically approximately 15.4 to approximately 16.5 psia, the flow through the low-pressure boil off compressor 8 is reduced or stopped. If at anytime any system parameters exceed predetermined critical values, the PLC 28 stops the low pressure boil off gas compressor 8 and shuts and/or closes the master gas block valve 12. If the master gas block valve 12 is shut manually or automatically as a result of an outside shut down signal such as from a vessel emergency shut down (ESD) system, the PLC 28 stops the high pressure boil off compressor 34 and the low pressure boil off gas compressor 8.

The amount of boil off gas removed from the vapor space 3 of tank 1 is governed by the amount of boil off gas that is re-condensed and returned to the cargo tank vapor space 2 and by the amount of boil off gas consumed by gas consuming prime movers 14 and 15. The PLC controls this process by monitoring and maintaining system pressures as described above.

FIG. 3 is a profile view of a non-self-propelled LNG carrier 43 (LNG barge) and tugboat 44. The non-self-propelled LNG carrier 43 is propelled through the water by the propulsion power provided by tugboat 44. According to at least one non-limiting embodiment, the tugboat 44 is secured to a stern notch fitted in LNG carrier 43 by mechanical connection devices 45 which restrict the relative motion between the tugboat 44 and LNG carrier 43 in multiple axes but, typically, also allows relative motion in the pitch axis. The LNG carrier 43 can utilize any of the above-noted systems and/or arrangements shown in FIGS. 1, 1*a* and 2.

FIG. 4 is a top plan view of the same non-self-propelled LNG carrier 43 and tugboat 44 illustrated in FIG. 3. The non-self-propelled LNG carrier 43 is propelled through the water by the propulsion power provided by the tugboat 44. As explained above, the tugboat 44 can be secured to a stern notch fitted in LNG carrier 43 by mechanical connections 45 restricting the relative motion between the tugboat 44 and LNG carrier 43 in multiple axes but, typically, allowing relative motion in the pitch axis.

It should be noted that a variety of methods and/or arrangements can be utilized to secure the tugboat 44 to the non-self-propelled LNG carrier 43 so as to allow the tugboat 44 to push the barge 43, i.e., the instant invention contemplates other ways of connecting and/or coupling the tugboat 44 to the barge 43 and is not limited to the arrangement shown in FIGS. 3 and 4.

FIG. 5 is a schematic representation of one non-limiting way in which power generated aboard the non-self-propelled LNG carrier 43 from the burning of boil off gas in gas consuming generator prime mover(s) is distributed and supplied to the tugboat 44 to provide propulsion power.

The gas burning generator prime mover(s) 46 are supplied with processed boil off gas through master gas block valve(s) 12 and the fuel gas distribution piping 13. The method of processing the boil off gas in preparation for consumption, as fuel gas, has been described above. The fuel gas is consumed in the gas burning generator prime mover 14 (as described above) and in additional prime movers 46 as may be required to meet power requirements. The gas burning prime movers 14 and 46 provide power for the electric generator 21 and the additional electric generators 47 as needed. The electricity that is generated is supplied to a common buss 24 aboard the LNG carrier 43. From there, the electricity is distributed as needed to meet power demands aboard the LNG carrier 43 by distribution feeder circuits 22, bow thruster feeder circuit 16, or such other feeder circuits as may be required.

The electric power required to meet the propulsion demands of the tugboat 44 as well as other electric power demands are provided by feeder circuits 48, flexible cables 49 suitable for exposed weather conditions and the voltage and amperage required. It is anticipated that the voltage will be a medium voltage circuit of approximately 6.6 kilovolts between the LNG carrier 43 and the tugboat 44 and tugboat feeder circuits 50. The flexible cables 49 are to be of such type as to allow timely disconnection to allow the tugboat 44 to disconnect and separate from the LNG carrier 43 when and as required should weather conditions require the tugboat to disengage from the LNG carrier or any other time that the tugboat is disengaged from the LNG carrier, such as in port or shipyard overhaul periods.

Electric power is supplied from a main electric buss 51 of the tugboat 44 through feeder circuits 52 to electric propulsion motors 53. The electric propulsion motors 53 turn propellers 55 of the tug boat 44 through appropriate mechanical arrangements such as shafts 54, gear boxes, etc.

In the case when the tugboat 44 operates separately from the LNG carrier 43, power for the tugboat 44 is supplied by conventional fueled generator prime movers 57 and associated electric generators 56 installed aboard the tugboat 44, which supply electric power to the main buss 51 via feeder cables 58.

If insufficient electric power is available from the LNG barge 43, for whatever reason, the balance of the required power for the tugboat 44 will be provided by the conventional fueled prime movers 57 and generators 56 aboard the tugboat 44.

The operation of a first method will now be described with regard to the system shown in FIGS. 1 and 1*a*. Upon completion of loading LNG into the cargo tank(s) 1 of the barge 43, the appropriate valves, i.e., valves in the pipe(s) 4, are opened to allow LNG boil off vapor 3 from the LNG cargo tank(s) 1 to flow to the common boil off vapor pipeline header 6. From there, it flows to the suction side of the low-pressure boil off vapor compressor 8. It then flows from the discharge side of compressor 8 to the heater 9 and then to the buffer tank 11. The heating medium 10 of heater 9 is placed in service, i.e., caused to circulate. The master gas valve 12 is maintained in the closed position.

The low-pressure boil off compressor 8 is started under the control of the PLC 28. Gas is allowed to flow to the buffer tank 11. The pressure in the buffer tank 11 is allowed to increase to a predetermined value at which time the flow through the low-pressure boil off compressor 8 is appropriately reduced or stopped under automatic control by PLC 28.

Once sufficient pressure is obtained in buffer tank 11, the gas consuming prime movers 14 and 15 are started and put under load. In the case of the bow thruster prime mover 15, the resulting thrust is neutralized so that the net thrust on the barge 43 is zero (0).

As fuel gas is consumed, the pressure in the buffer tank 11 decreases and the flow through the low-pressure boil off compressor 8 is increased as needed to meet the demand for fuel gas.

In the case of an electric motor bow thruster prime mover 17 (see FIG. 1a), the operation is identical with the exception that gas is only burned in the generator prime mover(s) 14.

The operation of a second method will now be described with regard to the system shown in FIG. 2. Upon completion of loading LNG into the cargo tank(s) 1 of the barge 43, the appropriate valves, i.e., valves in pipe 4, are opened to allow LNG boil off vapor 3 from the LNG cargo tank(s) 1 to flow to the common boil off vapor pipeline header 6 and then to the suction side of the high-pressure boil off vapor compressor 34 via pipe 33 and valves. The discharge side of compressor 34 is directed to the boil off gas condenser 35. Re-condensed LNG distribution control valve 29 (and 30 as appropriate) is open providing a return path to the cargo tank(s) 1. Re-condensed LNG spray nozzle control valve 38 is maintained in a closed position until design-operating pressure is achieved in the re-condensed LNG pipeline header 31. Power is provided to the PLC 28 and associated controls. Compressor 34 is started. As pressure builds in header 31, it is monitored by pressure transmitter 32. Once design pressure is achieved, the PLC 28 slows or stops the flow of boil off gas through compressor 34 as appropriate to maintain the design pressure. The system parameters can be developed by the system designers and tailored to system requirements.

The spray nozzle control valve 38 is opened as required to permit minimal flow of re-condensed LNG to the spray nozzles 37 of the tank 1.

The boil off vapor is allowed to flow from the header 6 to the suction side of low-pressure boil off vapor compressor 8 through the low-pressure side of boil off gas condenser 35. The discharge side of compressor 8 is directed to the heater 9 and the buffer tank 11. The heating medium 10 of heater 9 is placed in service. The master gas valve 12 is maintained in the closed position.

The low-pressure boil off compressor 8 is started under the control of the PLC 28. Gas is allowed to flow to the buffer tank 11. The pressure in the buffer tank 11 is allowed to increase to a predetermined value at which time the flow through the low-pressure boil off compressor 8 is appropriately reduced or stopped under automatic control by PLC 28.

Once sufficient pressure is obtained in buffer tank 11, the gas consuming prime movers 14 and 15 are started and put under load. In the case of the bow thruster prime mover 15, the resulting thrust is neutralized so the net thrust on the barge is zero (0).

As fuel gas is consumed, the pressure in the buffer tank 11 decreases and the flow through the low-pressure boil off compressor 8 is increased as needed to meet the demand for fuel gas. In the case of an electric motor bow thruster prime mover 17 (see FIG. 1a), the operation is identical with the exception that gas is only burned in the generator prime mover(s) 14.

As the re-condensation of LNG increases in the boil off gas condenser 35, as a result of further cooling from the flow of cold low pressure boil off vapor through the low pressure side of the boil off condenser 35, spray nozzle control valve 38 is opened further to admit increased flow to the spray nozzles 37 of tank 1. As the system reaches design flow conditions, the spray nozzle control valve 38 will be nearly fully opened, but in any case opened sufficiently to maintain system equilibrium.

The operation of a third method will now be described with regard to the system shown in FIGS. 3-5. Upon completion of loading LNG into the cargo tank(s) 1 of the non-self propelled marine liquefied natural gas carrier 43, the boil off vapor system(s) are placed in operation as appropriate and as described under the first and/or second methods noted above. The tugboat 44 is maneuvered into the stern notch of LNG barge 43 and the connection system is engaged (connection pins 45 being a typical method).

Once the tugboat 44 is in position, the flexible power cables 49 are connected between the tugboat 44 and the barge 43. The supply circuits are engaged such that electric power is provided as needed to the tugboat 44 from the barge 43. Electric power demand of the tugboat 44 is, either partially or in full, provided by the barge 43. The supplied power can be utilized for either or both normal electric power demands and/or propulsion power. All system control is controlled from the tugboat 44. Of course, there is occasional monitoring by personnel aboard the barge 43 on a periodic inspection basis.

The above description describes a non-limiting embodiments, including preferred embodiments, and are not intended to limit the instant invention. For instance, the systems and methods described above could be used to provide electric power to the tugboat to meet the electric power demands of the tugboat, but not the propulsion power demands. Such an approach will increase the consumption of boil off gas, and depending on the amount of boil off gas being generated, may be sufficient to provide for effective tank pressure control without using gas for propulsion power. As previously discussed, the systems and methods described herein may be applied singularly or in combination as needed and appropriate to provide effective LNG tank pressure control by consuming and/or re-condensing LNG boil gas in appropriate amounts.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE NUMERALS

1 Insulated LNG cargo tank
2 LNG contained within 1
3 Vapor space above the surface of 2 within 1
4 Pipeline to remove boil off gas from tank land transfer the boil off gas to header 6
5 Pipelines to remove boil off gas from other LNG cargo tank(s) of the marine vessel, if fitted.
6 Common boil off gas pipeline header
7 Pipeline to deliver boil off gas from header 6 to compressor 8

8 Low pressure boil gas compressor
9 Low pressure boil off gas heater
10 Heating medium to provide required heat for heater 9
11 Fuel gas buffer tank
12 Master gas block valve
13 Pipeline to supply compressed and heated fuel gas to gas consumers
14 Natural gas burning electric generator prime mover
15 Natural gas burning bow thruster prime mover
16 Electric power feeder to electric motor bow thruster prime mover 17
17 Electric motor bow thruster prime mover
18 Water jet, vectored thrust type bow thruster
19 Water inflow to bow thruster
20 Vectored thrust from bow thruster in aft direction
21 Electric generator driven by prime mover 14
22 Electric power feeder circuits to other electric power consumers, i.e. gas compressors
23 Electric power feeder circuit from generator 21 to bus 24
24 Main electric buss
25 Fuel gas buffer tank 11 pressure transmitter
26 LNG cargo tank vapor space pressure transmitter
27 Common boil off gas pipeline header 6 pressure transmitter
28 Programmable Logic Controller
29 Re-condensed LNG distribution control valve to LNG cargo tank 1
30 Re-condensed LNG distribution control valve to additional LNG cargo tank(s), if fitted
31 Re-condensed LNG pipeline header
32 Re-condensed LNG pipeline header pressure transmitter
33 Pipeline to deliver boil off gas from header 6 to compressor 34
34 high pressure boil gas compressor
35 Boil off gas condenser
36 Re-condensed LNG heat exchanger pipe within vapor space 3 of LNG cargo tank 1
37 Spray cooling header and nozzles within vapor space 3 of LNG cargo tank 1
38 Re-condensed LNG spray nozzle control valve
39 LNG spray nozzle control valve
40 Supply of LNG for spray cooling of LNG cargo tank 1
41 Re-condensed LNG supply pressure gauge
42 Spray nozzle LNG supply pressure gauge
43 LNG barge
44 Tugboat
45 Tugboat/barge connection pin
46 Natural gas burning electric generator prime mover(s)
47 Electric generator(s) driven by prime movers 46
48 Electric power feeder(s) to supply power to tugboat
49 Flexible electric power cable(s) linking non-self-propelled LNG carrier to tugboat
50 Electric power feeder(s) from 49 to tugboat main electric buss 51
51 Tugboat main electric buss
52 Electric power feeders from tugboat main electric buss 51 feeding power to tugboat electric main propulsion motor(s) 53
53 Tugboat electric main propulsion motor(s)
54 Tugboat main propulsion shaft(s)
55 Tugboat main propeller(s)
56 Tugboat electric generator(s)
57 Tugboat conventional fueled electric generator prime movers
58 Electric power feeder circuit from generators 56 to bus 51

What is claimed:

1. A method of operating a marine liquefied natural gas (LNG) carrier in which LNG is carried in at least one tank, said method comprising:
   removing gas composed of evaporated LNG from a vapor space of the at least one tank;
   feeding a first portion of the gas to at least one gas consuming prime mover of the LNG carrier; increasing a pressure of a second portion of the gas;
   re-liquefying the second portion of the gas by heat exchange; and
   feeding the re-liquefied second portion of the gas into the at least one tank in such a manner that some of the re-liquefied second portion of the gas evaporates as it is being fed into the at least one tank, whereby the vapor space of the at least one tank is cooled.

2. The method of claim 1, wherein the LNG carrier comprises a non-self-propelled LNG carrier.

3. The method of claim 1, wherein the at least one tank comprises at least one of an insulated pressure vessel, whereby the at least one tank is capable of storing the LNG at a specified equilibrium vapor pressure and temperature.

4. The method of claim 1, further comprising maintaining a specified pressure in the at least one tank by removing the gas generated by the evaporation of LNG within the at least one tank.

5. The method of claim 1, wherein increasing a pressure of a second portion of the gas comprises compressing the second portion of the gas, whereby the second portion of the gas is made suitable for re-liquefaction by cooling.

6. The method of claim 1, further comprising exchanging heat between the first portion of the gas and the second portion of the gas, wherein the first portion of the gas is in an un-compressed state.

7. The method of claim 6, further comprising cooling the re-liquefied second portion of the gas by exchanging heat between the re-liquefied second portion of the gas and boil off gas contained within the vapor space of the at least one tank.

8. The method of claim 1, further comprising cooling and re-liquefying the second portion of the gas, after the increasing, while simultaneously heating the first portion of the gas.

9. The method of claim 1, further comprising:
   exchanging heat between the first portion of the gas and the second portion of the gas; and
   processing the first portion of the gas after heat exchange with the second portion of the gas.

10. The method of claim 1, further comprising, after the increasing, cooling the re-liquefied second portion of the gas by exchanging heat between the re liquefied second portion of the gas and boil off gas contained within the vapor space of the at least one tank.

11. The method of claim 1, wherein the feeding of the re-liquefied second portion of the gas is performed through at least one spray nozzle that is arranged within the vapor space of the at least one tank.

12. The method of claim 1, further comprising at least one of:
   expanding, after the feeding, the second portion of the gas in the vapor space of the at least one tank;
   cooling, after the feeding, the second portion of the gas in the vapor space of the at least one tank; and
   condensing, after the feeding, the second portion of the gas in the vapor space of the at least one tank.

13. The method of claim 1, wherein the at least one tank comprises a plurality of insulated tanks.

14. The method of claim 1, wherein the LNG carrier comprises a non-self-propelled pressure vessel LNG carrier.

15. The method of claim 1, further comprising at least one of:
accumulating some of the gas that is not consumed by the at least one gas consuming prime mover;
storing some of the gas that is not consumed by the at least one gas consuming prime mover;
accumulating in at least one tank some of the gas that is not consumed by the at least one gas consuming prime mover; and
storing in at least one tank some of the gas that is not consumed by the at least one gas consuming prime mover.

16. The method of claim 1, further comprising accumulating in a tank some of the gas that is not consumed by the at least one gas consuming prime mover and decreasing a pressure within the tank over time.

17. The method of claim 1, further comprising accumulating in a tank some of the gas that is not consumed by the at least one gas consuming prime mover and increasing a pressure within the tank over time.

18. The method of claim 1, further comprising at least one of:
accumulating in the at least one tank some of the gas that is not consumed by the at least one gas consuming prime mover; and
storing in the at least one tank some of the gas that is not consumed by the at least one gas consuming prime mover.

19. The method of claim 1, further comprising accumulating in the at least one tank some of the gas that is not consumed by the at least one gas consuming prime mover and decreasing a pressure within the at least one tank over time.

20. The method of claim 1, further comprising accumulating in the at least one tank some of the gas that is not consumed by the at least one gas consuming prime mover and increasing a pressure within the at least one tank over time.

21. A marine liquefied natural gas (LNG) carrier comprising:
at least one tank storing LNG;
at least one LNG gas consuming prime mover;
an arrangement for removing gas composed of evaporated LNG from a vapor space of the at least one tank;
an arrangement for feeding a first portion of the gas to the at least one gas consuming prime mover;
an arrangement for increasing a pressure of a second portion of the gas;
an arrangement for re-liquefying the second portion of the gas by heat exchange; and
an arrangement for feeding the re-liquefied second portion of the gas into the at least one tank in such a manner that some of the re-liquefied second portion of the gas evaporates as it is being fed into the at least one tank, whereby the vapor space of the at least one tank is cooled.

22. The method of claim 1, further comprising the step of providing power generated by the at least one gas consuming prime mover to at least one bow thruster of the LNG carrier.

23. The method of claim 1, further comprising the step of providing power generated by the at least one gas consuming prime mover to at least one electric generator on the LNG carrier.

24. The method of claim 1, further comprising the step of providing power generated by the at least one gas consuming prime mover to a propulsion motor of a tug boat which provides propulsion to the LNG carrier.

25. The LNG carrier of claim 21, further comprising at least one bow thruster powered by the at least one LNG gas consuming prime mover.

26. The LNG carrier of claim 21, further comprising at least one electric generator powered by the at least one LNG gas consuming prime mover.

27. The LNG carrier of claim 21, further comprising at least one flexible cable for providing power generated by the at least one LNG gas consuming prime mover to a propulsion motor of a tug boat which provides propulsion to the LNG carrier.

28. The LNG carrier of claim 21, further comprising an arrangement for expanding the re-liquefied second portion of the gas in the vapor space of the at least one tank after it has been fed into the at least one tank.

29. The LNG carrier of claim 21, wherein the arrangement for feeding the re-liquefied second portion of the gas into the at least one tank comprises at least one spray nozzle located within the at least one tank.

* * * * *